Aug. 13, 1963  J. R. SOSOKA ETAL  3,100,832
WELDING
Filed Feb. 13, 1962  2 Sheets-Sheet 1
FIG_1_
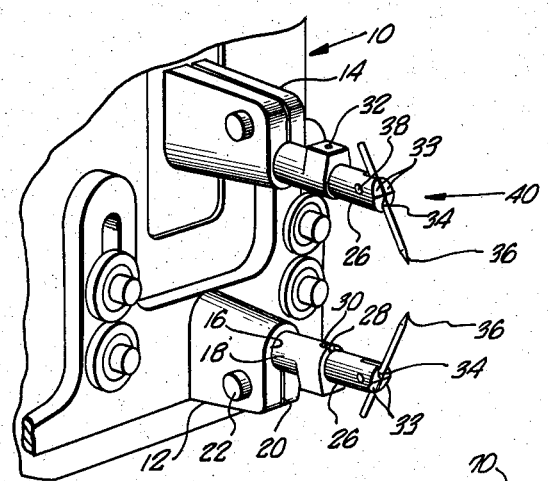
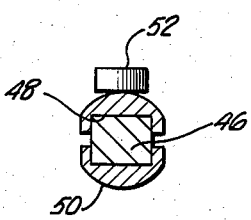
FIG_4_
FIG_5_
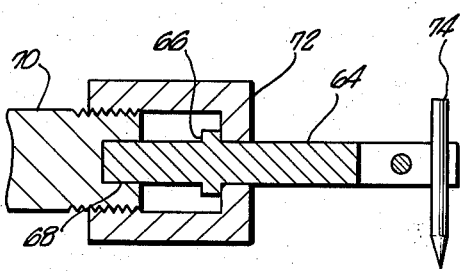
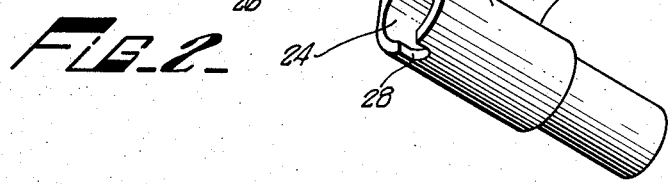
FIG_2_
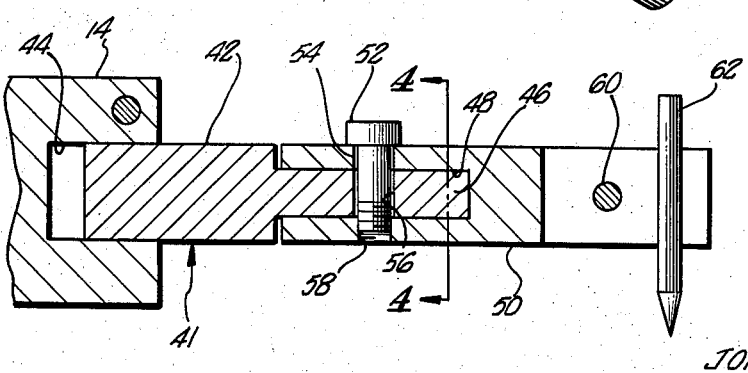
FIG_3_
INVENTOR.
JOHN R. SOSOKA
BY JOSEPH V. ROBINSON
Christie, Parker & Hale
ATTORNEYS.

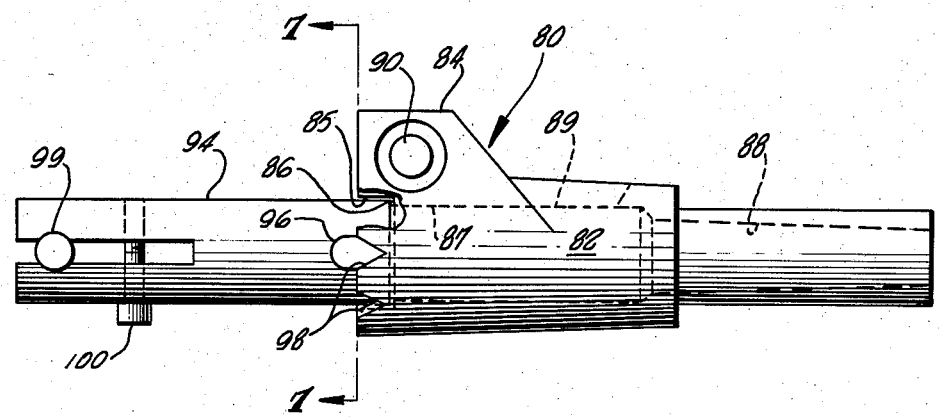
FIG. 6.
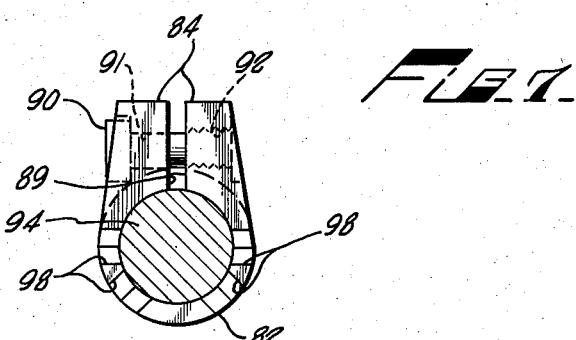
FIG. 7.
FIG. 8.
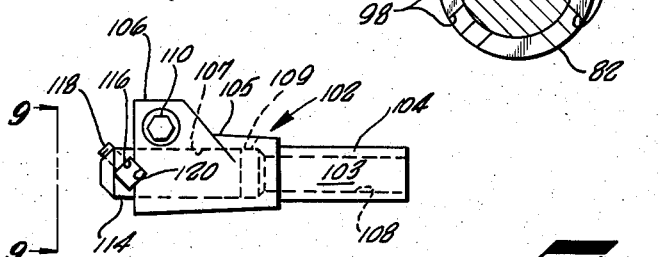
FIG. 9.
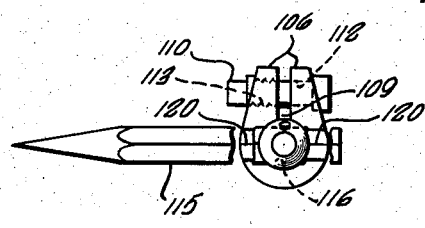
INVENTOR.
JOHN R. SOSOKA
BY JOSEPH V. ROBINSON
Christie, Parker & Hale
ATTORNEYS

United States Patent Office 3,100,832
Patented Aug. 13, 1963

3,100,832
WELDING
John R. Sosoka, Glendora, and Joseph V. Robinson, Arcadia, Calif., assignors to Unitek Corporation, Monrovia, Calif., a corporation of California
Filed Feb. 13, 1962, Ser. No. 172,992
2 Claims. (Cl. 219—86)

This invention relates to spot welders, and more particularly to a self-aligning assembly for spot welder electrodes.

In conventional spot welding, metal pieces are squeezed together between electrode tips. After the application of proper pressure, current is passed from the electrodes through the metal pieces. The high resistance at the point of contact between the parts cause the metal to melt and the parts to fuse together.

With repeated use, the electrode tips tend to become pitted or dirty and must be cleaned or reshaped as necessary. To minimize work stoppage on a production line, and to avoid the possibility of contaminating products, the cleaning and reshaping of electrode tips preferably is done in a special area located away from the equipment.

In the past, when an electrode tip became pitted or dirty, the operator removed the tip from the welder, and replaced the tip with a new one. This procedure has the disadvantage, particularly for precision work, of leaving it to the judgment and skill of the individual operator to locate the new electrode tip properly in the electrode arm. This procedure is time consuming and does not always produce uniform results due to variations in techniques of individual operators. For particularly delicate work, which may require watch-making precision, it has been common practice to use special aligning tools in an effort to obtain proper mounting of the new electrode tips. This procedure is also time consuming, and does not always produce uniform results.

This invention provides a self-aligning electrode tip holder which automatically fits into a desired position on a welder arm to mount a new electrode tip in the proper position. With the self-aligning holder of this invention, a worn electrode tip is replaced by an operator simply removing the electrode tip holder from the welding arm. Another holder, on which is mounted a new or reworked electrode tip, is automatically and quickly mounted on the electrode arm by the operator. This eliminates the need for the operator to adjust the position of the electrode tip, and also produces uniform results, regardless of the operator's individual skill.

Briefly, the invention includes a body having a portion adapted to be secured to the arm of a spot welder. A holder is adapted to fit with the body. The body and holder each include respective aligning means which mate when the body and holder are fitted together, so that the aligning means automatically lock the body and holder in a fixed position with respect to each other. An electrode tip is mounted on the holder so that when the holder is fitted to the body, the tip is automatically secured in the desired position with respect to the welder arm.

Preferably, means are provided for releasably securing the electrode tip to the holder. With this arrangement, the electrode tips can be removed from the holder, properly cleaned, and reshaped as necessary, and then be relocated in the holder by a jig which accurately positions the tip in the holder. The tip can then be rigidly clamped to the holder and the holder and tip returned to the production line for further use. With this arrangement, worn or dirty electrode tips can be cleaned and reshaped by skilled workers in an area remote from the production line. The tips are also accurately located on the holders by specialized workers using jigs particularly designed for such work. Thus, the tips are accurately mounted on the holders without interfering with production.

Preferably, the assembly includes a pair of arms and holders so that a pair of opposing electrode tips can be mounted on two welder arms with respective self-aligning assemblies.

The preferred embodiment also includes means for securing the body to the arm to be adjustable in a direction transverse to the direction of arm movement during the welding operation. Such an adjustment permits fine compensation for tolerance variations in construction of the welder. The aligning means on the holder and body preferably prevent a rotation of the holder about its longitudinal axis and also serve as a stop to limit the longitudinal travel of the holder in one direction with respect to the body.

These and other aspects of the invention will be more fully understood from the following detailed description and the accompanying drawings, in which:

FIG. 1 is a fragmentary perspective view of a spot welder having electrode tips mounted with the self-aligning assembly of this invention;

FIG. 2 is an exploded view of the holder and body as shown mounted on the arms in the welder of FIG. 1;

FIG. 3 is a fragmentary sectional elevation of alternate embodiment of the invention;

FIG. 4 is a view taken on line 4—4 of FIG. 3;

FIG. 5 is a fragmentary sectional elevation of another embodiment of the invention;

FIG. 6 is a side elevation of an alternate embodiment of the body and electrode holder;

FIG. 7 is a view taken approximately on line 7—7 of FIG. 6;

FIG. 8 is a side elevation of the presently preferred embodiment of the body and electrode holder; and FIG. 9 is a view taken on line 9—9 of FIG. 8.

Referring to FIGS. 1 and 2, a welder 10, say of the type disclosed in U.S. Patent 2,872,564, includes a first or horizontal lower arm 12 and a second or horizontal upper arm 14 in a plane which passes through lower arm 12. The upper arm is movable toward and away from the lower arm in the plane common to both arms. The mounting of the arms can be of any suitable arrangement, such as that shown in U.S. Patent 2,872,564.

The lower arm includes a longitudinal cylindrical bore 16 opening out of its outer end to receive the inner end of an elongated cylindrical body 18. The lower portion of the lower arm includes a longitudinal split 20 extending from the bore to the bottom edge of the arm. A transverse socket head screw 22 extends through a bore (not shown) on one side of the split arm and into a threaded bore (not shown) on the other side of the arm. Thus, by turning the screw 22 in one direction, the body 18 is rigidly clamped in the arm. By turning the screw in the opposite direction, the body is released from the arm so the body can be rotated about its longitudinal axis or moved longitudinally with respect to the arm.

The outer end of the body includes a longitudinal cylindrical bore 24 which receives the inner end of an elongated, generally cylindrically shaped holder 26. The upper portion of the body includes a longitudinal slot 28 extending from the outer end of the bore a short distance toward the welder to receive a projection 30 on the holder. Thus, the holder slips the maximum distance into the body only when the projection 30 is aligned with slot 28. A transverse socket head set screw 32 in the body is adjusted to bear against the holder and prevent it from moving longitudinally in the body.

The outer end of the holder is bifurcated into opposing sections 33, each of which include opposing semicircular grooves 34 to receive an elongated electrode tip 36. A transverse socket head screw 38 extends through the bifurcated portion of the holder and is threaded into one of the portions 33. The electrode tip can be rotated and adjusted longitudinally with respect to the holder, and then be clamped firmly in a desired position by tightening screw 38.

An upper self-aligning electrode assembly 40 is mounted on the upper arm of the welder. The upper self-aligning assembly is identical with the lower end, and therefore a detailed description of it is not repeated. However, like reference numbers have been placed on corresponding elements.

Ordinarily, the respective bodies on each arm are accurately adjusted along their longitudinal axes and located to position the electrode tips on a line parallel to the direction in which the movable arm moves.

In the use of the assembly shown in FIGS. 1 and 2, the upper arm is moved toward and away from the lower arm to bring the electrode tips into contact with the work (not shown). If one of the tips becomes pitted or dirty, it is removed simply by loosening screw 32 and sliding the holder longitudinally out of the body. Another holder (not shown) with a clean and properly shaped electrode tip, which has previously been directly positioned in the holder, is slipped into the outer end of the body opening and clamped firmly in place by tightening screw 32. The projection 30 and slot 28 insure correct alignment of the replaced electrode tip. Thus, an operator need not be concerned about cleaning or reshaping an electrode tip, or trying to align the tip with respect to the welder arm. This reduces down time for the machine, and increases the quality and uniformity of the work.

Of course, the holder need not fit into a body opening and the mating portions of the body and holder need not necessarily be round. An alternate embodiment is shown in FIGS. 3 and 4, using the upper arm of the welder as an example. A body 41 includes a cylindrical portion 42 which fits into a cylindrical bore 44 of the upper arm 14. The outer end of the body includes an integrally formed tongue 46 which is square in cross section and extends into a matching opening 48 at the split inner end of an electrode tip holder 50. A socket head screw 52 extends down through a bore 54 in the upper portion of the notched part of the holder. The screw also extends through a bore 56 in the tongue of the body and is threaded at its lower end into a threaded bore 58 in the bottom part of the notched portion of the holder. When screw 52 is tightened, the holder is clamped firmly against the tongue to make good electrical contact. The outer end of the holder is bifurcated and is clamped together by a screw 60 to hold an electrode tip 62. The advantage of the arrangement in FIGS. 3 and 4 is that it provides for surface contact between the body and the holder to provide good electrical contact.

In the arrangement shown in FIG. 5, a holder 64 includes a flange 66 spaced from its inner end, and fits at its inner end into an opening 68 at the outer end of a bore 70. The opening 68 and cross section of the inner end of the holder can be any desired shape, but, preferably, it is one other than circular to provide automatic orientation of the holder about its longitudinal axis with respect to the body. For example, the opening 68 and cross section of the inner end of the holder 64 may be square, or hexagonal, to provide a variety of holder positions. A collar 72 makes a close fit at its outer end around the holder 64, which is round in cross section to the right (as viewed in FIG. 5) of the flange 66. The inner end of the collar is threaded internally to screw onto the external threaded outer end of the body 70. Thus, as the collar 72 is tightened onto the body, the collar bears against the flange 66 and forces the holder into the opening 68. An electrode tip 74 is secured to the outer end of the holder as previously described for the other embodiments.

In the embodiment of FIGS. 6 and 7, the self-aligning assembly includes an elongated body 80 having a bore 82 extended entirely through it. The right (as viewed in FIG. 6) end of the body is cylindrical and adapted to fit into a welder arm, such as one of those shown in FIG. 1. The left end of the body is of larger external diameter and includes a pair of opposed ears 84 formed integrally at the left end of the body.

The left end of bore 82 includes a relatively short and large diameter section 85 which steps down at a shoulder 86 to a relatively long and slightly smaller diameter section 87. The right end of section 87 merges into an elongated and slightly tapered section 88, which reduces the mass of the body. The upper (as viewed in FIGS. 6 and 7) portion of the enlarged part of the body is split between the ears 84 along a longitudinal slot 89 from the left (as viewed in FIG. 6) end of the body to a point just short of the right end of the enlarged body portion. A transverse socket head screw 90 extends through bores 91 and 92 in the ears 84. Transverse bore 92 is threaded so that as screw 90 is tightened, opposite halves of the body are forced to squeeze tightly against the right (as viewed in FIG. 6) end of an elongated generally cylindrical holder 94 disposed in the section 87 of bore 82. The holder carries an outwardly extending and integrally formed aligning projection 96, which is V-shaped, with the V pointing to the right (as viewed in FIG. 6) along the longitudinal axis of the holder to fit into one of the four V-shaped notches 98 located around the periphery of the left end of section 85 of bore 82. Thus, the particular notch in which projection 96 fits accurately locates an electrode tip 99 secured to the left (as viewed in FIG. 6) of the holder by a screw 100 in a manner previously described.

The arrangement shown in FIGS. 6 and 7 has the advantage of providing good electrical contact between the body and the holder, and also permits the holder to be accurately adjusted into any one of the several positions determined by the notches 98. This increases the flexibility and utility of the welder.

In the presently preferred embodiment shown in FIGS. 8 and 9, an elongated body 102 has a bore 103 extending entirely through it. The right (as viewed in FIG. 8) end 104 of the body is cylindrical and adapted to fit into a welder arm. The left end 105 of the body is of larger external diameter and includes a pair of outwardly extending opposite ears 106 formed integrally with the body.

The left end of bore 103 includes a first section 107 which tapers down to a second section 108 of slightly smaller diameter to form the right end of bore 103.

The upper (as viewed in FIGS. 8 and 9) portion of the enlarged part of the body is a split between the ears 106 along longitudinal slot 109 from the left (as viewed in FIG. 8) end of the body just short of the right end of the enlarged body portion.

A transverse socket head screw 110 extends through a smooth bore 112 in one of the ears and into a threaded bore 113 in the other ear, so that as the screw 110 is tightened, opposite halves of the body are forced to squeeze tightly against the right (as viewed in FIG. 8) end of an elongated and generally cylindrical holder 114 disposed in section 107 of bore 103. A transverse elongated electrode tip 115 of square cross section is disposed in a transverse hole 116 of matching cross section to extend through the left (as viewed in FIG. 8) end of the holder. A set screw 118 secures the electrode tip in the holder. The hole in the holder and the electrode tip are oriented so that one corner of the square cross section of the tip extends into a pair of collinear V-shaped notches 120 formed across the left (as viewed in FIG. 8) end of the body adjacent the outer end of the section 107 of bore 103. Thus, the electrode tip serves as its own guide and aligning means when the holder is disposed in the body as shown in FIGS. 8 and 9. This arrangement has the advantage of eliminating the need for aligning the electrode tip with respect to a separate aligning means on the holder, as is the case with the other embodiments shown in the drawings.

We claim:

1. A self-aligning assembly for spot welder electrodes, the assembly comprising a body having a portion adapted to be secured to an arm of a spot welder, a holder adapted to fit with the body, first aligning means on the body, second aligning means on the holder, so when the body and holder are fitted together they are located in a fixed position with respect to each other, and an electrode tip secured to the holder.

2. A self-aligning assembly for spot welder electrodes, the assembly comprising a body having an opening and a portion adapted to be secured to an arm of a spot welder, a holder adapted to fit into the opening in the body, the body having a plurality of notches in it and spaced around the opening, a projection on the holder disposed to fit into any one of the notches so the body and holder may be fitted together in different fixed positions with respect to each other, means for clamping the body and holder together, and an electrode tip secured to the holder.

References Cited in the file of this patent

UNITED STATES PATENTS

| | | |
|---|---|---|
| 2,249,937 | Bohn | July 22, 1941 |
| 2,578,835 | Pityo et al. | Dec. 18, 1951 |